United States Patent [19]
Robson

[11] 3,904,738
[45] Sept. 9, 1975

[54] ZEOLITE RHO
[75] Inventor: Harry E. Robson, Baton Rouge, La.
[73] Assignee: Exxon Research & Engineering Co., Linden, N.J.
[22] Filed: June 21, 1973
[21] Appl. No.: 372,231

[52] U.S. Cl............ 423/328; 423/329; 252/455 Z
[51] Int. Cl.² ........................................ C01B 33/28
[58] Field of Search.............. 423/328, 329, 330; 252/455 Z

[56] References Cited
UNITED STATES PATENTS

| | | | |
|---|---|---|---|
| 3,130,006 | 4/1964 | Rabo et al. | 423/328 |
| 3,130,007 | 4/1964 | Breck | 423/329 |
| 3,247,195 | 4/1966 | Kerr et al. | 423/328 |
| 3,647,682 | 3/1972 | Rabo et al. | 252/455 Z X |
| 3,720,753 | 4/1973 | Robson | 423/328 |

Primary Examiner—Oscar R. Vertiz
Assistant Examiner—Brian E. Hearn
Attorney, Agent, or Firm—A. H. Krumholz; Roy J. Ott

[57] ABSTRACT

A novel small pore size crystalline alumino-silicate zeolite, and methods for its synthesis, are described. This new zeolite, having a composition in terms of mole ratios of oxides of:

0–1 $Na_2O$ : 0–1 $Cs_2O$ : $Al_2O_3$ : 5–7 $SiO_2$ : 0–10 $H_2O$ has a unique crystal structure and sorption properties.

7 Claims, No Drawings

ZEOLITE RHO

BACKGROUND OF THE INVENTION

The present invention relates to a novel small pore synthetic crystalline aluminosilicate zeolite, and methods for preparing same. More particularly, it relates to a synthetic crystalline aluminosilicate zeolite having uniform pore openings of from about 3 to 5 Angstroms, and further having silica to alumina ratios in the as-synthesized form of greater than about 5.0. Still more particularly, it relates to such a synthetic crystalline aluminosilicate zeolite having higher sorption capacities than other small pore zeolites previously prepared.

Crystalline aluminosilicate zeolites, commonly referred to as "molecular sieves," are now quite well known in the art. These materials are characterized by a very highly ordered crystalline structure arranged such that uniformly dimensioned pores result. The crystal structure of the zeolites involves a three dimensional framework of $AlO_4$ and $SiO_4$ tetrahedra which are crosslinked by the sharing of oxygen atoms, so that the ratio of oxygen atoms to the total of aluminum and silicon atoms is equal to 2. The electro-negativity of these tetrahedra is balanced by the presence within the crystal of cations, usually alkali metal cations, such as sodium and potassium ions. The term molecular sieves derives from the characteristic of these crystalline zeolite materials to selectively adsorb or reject molecules on the basis of their size, form and type. Thus the openings or pores of the crystalline zeolites, formed by the expulsion of water of hydration originally occupying these sites, will determine the particular molecular separation achievable with the particular zeolite. A number of these synthetic crystalline aluminosilicate zeolites have been prepared heretofore, and as they have developed in this art have now been generally grouped into two basic categories, namely so-called "large pore" and "small pore" zeolites. As employed in the present specification, the term large pore zeolites refers to metallic crystalline aluminosilicate zeolites characterized by having uniform pore openings in the range of about 6 to 15 Angstroms, and the term small pore zeolites, refers to such crystalline aluminosilicate zeolites having uniform pore openings of less than about 6 Angstroms, generally in the range of from 3 to 5 Angstroms.

The former, or large pore zeolites include such zeolites as faujasite, mordenite, gmelinite, and synthetic counterparts, particularly those of faujasite, namely zeolites X and Y, as described in U.S. Pat. Nos. 2,882,244 and 3,130,007, respectively.

The latter, or small pore zeolites, include such crystalline aluminosilicate zeolites as erionite, chabazite, phillipsite, and such synthetic counterparts thereof as zeolites A and ZK5, as described in U.S. Pat. Nos. 2,882,243 and 3,247,195, respectively.

The structures of each of these zeolites are best differentiated by the use of X-ray diffraction patterns. The patterns of each of these above-noted synthetic zeolites are described in the respective patents noted, and contrasted with other such zeolites in that manner. These patents additionally refer to the methods generally employed in preparing such zeolites.

Generally, in making such synthetic crystalline aluminosilicate zeolites, four ingredients are normally required in the reaction mixture, and the molar proportions of these ingredients to each other largely determines which type of zeolite is produced and whether other extraneous crystalline materials are produced. It is thus known to produce synthetic faujasites (types X and Y zeolites) by mixing the ingredients as shown below in Table I.

TABLE I

| Reactants, Mole Ratios | $SiO_2/Al_2O_3$ in Product 2–3 | 3–7 |
|---|---|---|
| $Na_2O/SiO_2$ | 0.7–1.0 | 0.28–0.45 |
| $SiO_2/Al_2O_3$ | 2.5–5.0 | 8–30 |
| $H_2O/Na_2O$ | 20–60 | 20–60 |

The four principal reactants present in the reaction mixture, namely soda ($Na_2O$), silica ($SiO_2$), alumina ($Al_2O_3$), and water ($H_2O$), are added from source materials which may contain one or more of the reactants in amounts sufficient to obtain the proportion of each of these constituents to the others as noted. Thus, soda may be added as either sodium silicate, sodium aluminate, sodium hydroxide, silica as sodium silicate or an aqueous sol of colloidal silica, or as silica gel; alumina as sodium aluminate, alumina hydrate, or as an aqueous aluminum sol, and the water is added separately or as a component of one or the other constituents.

In accordance with the present invention, a novel crystalline aluminosilicate zeolite and methods for its preparation are provided. This material, having superior physical and absorptive properties, may be expressed in terms of stoichiometric mole ratios of oxides, as follows $$X\ Na_2O:(1-X)\ Cs_2O:Al_2O_3:Y\ SiO_2:Z\ H_2O$$

wherein X may be any value from 0 to 1, preferably from 0.6 to 0.9, Y may be any value from 5 to about 7, preferably from 5.5 to about 6.5, and most preferably greater than 5.8 to about 6.3, and Z may be any value from 0 to about 10.

The X-ray diffraction pattern of the as-synthesized zeolite prepared according to the present invention is contained in Table II. The (Na,Cs) form refers to the zeolite as crystallized; H-form is the same material after ion-exchange to replace $Na^+$ and $Cs^+$ by $NH_4^+$, followed by calcination to drive off $NH_3$. The first column ($h^2+k^2+l^2$) refers to the Miller indices of the cubic structure with a unit cell size of about 15 A.

TABLE II

X-RAY DIFFRACTION DATA FOR ZEOLITE RHO

| $h^2+k^2+l^2$ (1) | (Na,Cs) form d(A) | $I/I_o$ | H form d(A) | $I/I_o$ |
|---|---|---|---|---|
| 2 | 10.33 | 100 | 10.53 | 100 |
| 4 | 7.25 | 3 | 7.44 | 3 |
| 6 | 5.95 | 30 | 6.09 | 41 |
| 8 | 5.14 | 1 | 5.28 | 8 |
| 10 | 4.61 | 2 | 4.72 | 16 |
| 12 | 4.20 | 13 | 4.31 | 3 |
| 14 | 3.90 | 16 | 4.00 | 6 |
| 16 | 3.64 | 1 | 3.74 | 6 |
| 18 | 3.44 | 51 | 3.52 | 26 |
| 20 | 3.26 | 52 | 3.35 | 17 |
| 22 | 3.11 | 24 | 3.19 | 2 |
| 24 | 2.979 | 32 | 3.05 | 6 |
| 26 | 2.862 | 8 | 2.936 | 13 |
| 28 | — | — | — | — |
| 30 | 2.667 | 22 | 2.730 | 8 |
| 32 | 2.578 | 1 | 2.648 | 2 |
| 34 | 2.501 | 4 | 2.567 | 1 |
| 36 | 2.433 | 4 | 2.495 | 7 |
| 38 | 2.368 | 2 | 2.430 | 1 |
| 40 | 2.309 | 7 | — | — |
| 42 | 2.254 | 3 | — | — |
| 44 | 2.201 | 9 | 2.259 | 2 |

TABLE II-continued

X-RAY DIFFRACTION DATA FOR ZEOLITE RHO

| $h^2+k^2+l^2$ (1) | (Na,Cs) form d(A) | I/I$_o$ | H form d(A) | I/I$_o$ |
|---|---|---|---|---|
| 46 | 2.154 | 2 | 2.209 | 1 |
| 48 | — | — | — | — |
| 50 | 2.067 | 6 | 2.120 | 2 |
| 52 | 2.025 | 3 | — | — |
| 54 | 1.987 | 2 | 2.040 | 2 |
| 56 | 1.951 | 4 | 2.002 | <0.5 |
| 58 | 1.918 | 2 | — | — |
| 60 | — | — | — | — |
| 62 | 1.855 | 3 | 1.903 | 3 |
| 64 | 1.824 | 3 | 1.873 | 2 |
| 66 | 1.798 | 4 | 1.845 | 1 |
| 68 | 1.771 | 5 | 1.817 | <0.5 |
| 70 | 1.746 | 0.5 | — | — |
| 72 | 1.722 | 4 | 1.767 | 2 |
| 74 | 1.698 | 6 | 1.741 | <0.5 |
| 76 | 1.675 | 0.5 | — | — |
| 78 | 1.653 | 2 | — | — |
| 80 | 1.633 | <0.5 | — | — |
| 82 | 1.613 | 2 | 1.656 | 1 |
| 84 | 1.594 | 1 | — | — |
| 86 | 1.575 | 2 | 1.617 | 2 |
| 88 | 1.556 | 1 | 1.598 | 1 |
| 90 | 1.540 | 1 | 1.580 | 2 |
| 92 | — | — | — | — |
| 94 | 1.506 | 2 | 1.545 | <0.5 |
| 96 | 1.490 | 3 | — | — |
| 98 | 1.475 | 4 | 1.513 | 1 |
| 100 | — | — | 1.499 | 1 |

(1) For Im3m.

The silica/alumina framework of the zeolite structure which this pattern represents was predicted by Meier in Molecular Sieves (Zeolite conference, School of Pharmacy, University of London, Apr. 4–6, 1967), Society of Chemical Industry, London, 1968, at pages 10–27. This material has now actually been prepared, but using a process completely different from those previously employed, e.g. such as those described above. Thus, it has basically been discovered that by employing reaction mixtures quite comparable to those described in U.S. Pat. No. 3,130,007 for the preparation of zeolite Y, having the structure of faujasite, but in which a limited amount of cesium, derived from the use of a cesium source such as cesium hydroxide as a reactant in the reaction mixture, is substituted for a specified portion of the soda, or sodium source, results in the preparation of the present novel synthetic crystalline aluminosilicate zeolite, which not only has an X-ray diffraction pattern quite distinct from that of faujasite, but which has uniform pore openings of about 5 Angstroms, i.e. is a small pore zeolite, as compared to faujasite, a large pore zeolite.

The novel synthetic crystalline aluminosilicate zeolite thus described, having uniform pore openings within the range of about 3 to 5.5 Angstrom units, is thus prepared from an aqueous reaction mixture containing silica, alumina, sodium and cesium, in the form of the sources described above. The specific proportions of these reactants in the initial reaction mixture are determined from the molar ratios contained in Table III, which are to be regarded as critical to the successful production of a high purity and highly crystalline product substantially free of extraneous phases, and with attractive yield and utilization of reactants.

TABLE III

| Reactant Ratio | Broad | Preferred | Most Preferred |
|---|---|---|---|
| $SiO_2/Al_2O_3$ | 6–20 | 9–12 | 10 |
| $(Na_2O+Cs_2O)/SiO_2$ | 0.2–0.5 | 0.3–0.4 | 0.34 |
| $H_2O/SiO_2$ | 5–20 | 6–12 | 8 |
| $Cs_2O/(Na_2O+Cs_2O)$ | 0.05–0.30 | 0.06–0.20 | 0.12 |

In accordance with the present process, the above reactants are thoroughly mixed at ambient temperatures, incubated at ambient temperature for 3 to 7 days, heated to a temperature of from about 50° to 110°C, preferably 60° to 90°C, and most preferably 70° to 80°C, and held at such elevated temperatures for a sufficient period of time to form the crystalline zeolite product, preferably from 3 to 60 days and most preferably from 7 to 21 days. The pressure utilized will usually be about atmospheric pressure in the case of operation at or below 100°C, and will correspondingly increase at temperatures higher than 100°C. in order to prevent substantial loss of water from the reaction mixture. Typical optimum crystallization times for temperatures of 100°C will be 1 to 3 days; for 90°C, 3 to 12 days; for 80°C, 6 to 20 days; for 70°C, 7 to 28 days; and for 60°C, 14 to 42 days. After formation of the crystalline zeolite phase, the zeolite crystals are filtered from the mother liquor and preferably washed throughout until the water wash has a pH of about 10 to 12. During the washing step the sodium and cesium cations may be partially removed, owing to their exchange with the hydrogen ions in the wash liquid. After the washing step the zeolite crystals are preferably exchanged with $NH_4^+$ salt solutions, washed and dried in air at a temperature, for example, of about 100° to 130°C. The crystals may be finally activated for use as an adsorbent or as a catalyst support by heating at a temperature of 300° to 500°C. to thereby drive off the water of hydration, leaving a crystalline structure interlaced with canals of molecular dimensions.

In the most preferred embodiment of this invention, the reactants are supplied from the following source materials; sodium as sodium hydroxide, silica in the form of silica sol, alumina as $Al_2O_3.3 H_2O$, and cesium as cesium hydroxide. The molar ratios of these oxides are set forth in the particularly preferred amounts as shown in Table III. A temperature of crystallization of 80°C is utilized and the crystallization period is continued for about 7 days or longer. The product of the present invention is particularly valuable as an adsorbent for such purposes as separation of different size and shape molecular species, for example, in petroleum derived feeds, as well as serving as valuable catalytic materials and supports after suitable modification by base exchange and deposition of catalytically active metals by procedures well known in this art. Such uses for the crystalline aluminosilicate zeolites of the present invention are highly improved by several of the significantly improved characteristics of the products of the instant invention. These improved properties are highlighted by the increased sorption capacity as indicated by the zeolite of the present invention having surface areas (B.E.T.) of from 600 to 750 m²/g, preferably greater than 700 m²/g. This may be compared to surface areas of from 300 to 500 m²/g for zeolite A, and from 100 to 300 m²/g for erionite. Additionally, as noted above, the zeolite of the present invention has a silica/alumina mole ratio in its as-synthesized form of from 5 to 7, whereas zeolite A has a silica to alumina ratio of about 2. This property thus manifests itself in superior steam and acid resistance, particularly in the valuable hydrogen exchanged form, for the instant zeolite as compared to both zeolites A and faujasite.

In addition to the potential use of the products of the present invention as valuable adsorbent materials, as catalysts and catalyst bases they may be employed for various conversion reactions, particularly hydrocarbon conversion reactions such as catalytic cracking, hydrocracking, hydroisomerization, hydrodealkylation, alkylation, isomerization, reforming, hydroforming, and like processes. For these purposes it will usually be desired to base exchange the assynthesized zeolite with any of a variety of metal cations and/or hydrogen or ammonium cations. The cations which can thus be used as exchange media for the present zeolites, so as to cause the alkali metal cation content to be reduced to values of less than about 5 wt. %, preferably less than about 2 wt. %, are incorporated by means well known in this art, and include hydrogen and hydrogen precursor ions, such as ammonium, cations of metals in Groups IIA, IIIB, VIII and IIB, particularly Groups IIA and IIIB, and most particularly Group IIIB of the Periodic Table. Suitable metallic hydrogenation components which can be impregnated or incorporated into the base exchange zeolites of the present invention in order to form superior hydrocarbon conversion catalysts for various processes involving the use and consumption of hydrogen (e.g., hydrocracking) include the metals, oxides, or sulfides of metals in Groups VIB and VIII, particularly Group VIII of the Periodic Table. Mixtures of any of the aforementioned metal cations and/or metals, oxides and sulfides can also be used depending upon the particular reaction desired and the quantity and quality of the ultimate end product desired.

DESCRIPTION OF THE PREFERRED EMBODIMENTS

EXAMPLE 1

A highly crystalline sample of the zeolite Rho of the present invention was prepared by utilizing the following procedure, which may be considered typical of the procedures employed in the remainder of the syntheses described below:

A reaction mixture was prepared by combining 92.7 grams of sodium hydroxide, 62.4 grams of alumina hydrate, and 100 grams of water. This mixture was cooled to room temperature, and a solution of 48 grams of cesium hydroxide in 44 grams of water were added. Into this mixture was blended 618 grams of HS-40 Ludox as a source of silica. After incubation for 4 days at room temperature (25°C) the mixture was heated to 80°C in an oil bath, and maintained for 7 days. The crystallized product was washed and dried, and was analyzed as highly crystalline zeolite Rho, having the following analysis, in terms of molar ratios of oxides:

$$(0.64\ Na_2O:0.22\ Cs_2O)\ Al_2O_3:6.3\ SiO_2$$

EXAMPLE 2

A series of such syntheses were carried out, each varying one or more of the crystallization conditions. The results included in Tables IV and V demonstrate the criticality of the cesium content of the reaction mixture, the crystallization conditions, and the molar ratios of other reactants, as well as the incubation periods employed.

TABLE IV

ZEOLITE SYNTHESIS EXPERIMENTS

| | Reactants - Molar Ratios | | | Crystallization Conditions | | | | |
|---|---|---|---|---|---|---|---|---|
| SiO₂/ Al₂O₃ | (Na₂O+Cs₂O)/ SiO₂ | H₂O/ SiO₂ | Added Alkali | Time, days | | Temp.°C | Reaction Products- Crystallinity | Extra Phases |
| | | | | Incubation | Crystallization | | | |
| 10.0 | 0.33 | 10.0 | 10% CsOH | — | 1 | 100 | Zeolite Rho | |
| 10.0 | 0.33 | 10.0 | 10% CsOH | — | 4 | 100 | Zeolite Rho | |
| 10.0 | 0.30 | 10.0 | 10% CsOH | — | 3 | 100 | Zeolite Rho-Strong | +Zeolite D-weak |
| 10.0 | 0.33 | 8.0 | 9% CsOH | — | 3 | 100 | Pollucite | |
| 10.0 | 0.32 | 8.5 | 6% CsOH | — | 2 | 100 | Zeolite Rho-Weak | + Fauj.-weak |
| 10.0 | 0.33 | 11 | 9% CsOH | 30 | 12 | 90 | Zeolite Rho-Med. | |
| 10.0 | 0.33 | 11.2 | 9% CsOH | 2 Hrs.* | 3 | 90 | Zeolite Rho-Strong | |
| 10.0 | 0.33 | 11.2 | 20% KOH 9% CsOH | 2 Hrs.* | 4 | 90 | Chabazite-Med. | |
| 10.0 | 0.33 | 11.2 | 20% KOH 9% CsOH | 2 Hrs.* | 8 | 90 | Chabazite-Med. | |
| 10.0 | 0.33 | 11.2 | 39% KOH 9% CsOH | 2 Hrs.* | 8 | 90 | Erionite-Med. | + Chabazite - weak |
| 8.0 | 0.32 | 12.0 | 30% CsOH | 2 Hrs.* | 6 | 90 | Chabazite-Med-Weak | |
| 8.0 | 0.32 | 12.0 | 15% KOH 15% CsOH | 2 Hrs.* | 4 | 90 | Chabazite-Weak | |
| 8.0 | 0.32 | 12.0 | 15% RbOH 15% CsOH | 2 Hrs.* | 6 | 90 | Chabazite-Med-Weak | |
| 8.0 | 0.32 | 12.0 | 15% CsOH | 2 Hrs.* | 2 | 90 | Chabazite-Med-Weak | + Zeolite Rho |
| 10.0 | 0.32 | 11.2 | 6% CsOH | 2 Hrs.* | 27 | 80 | Zeolite Rho-Weak | + Fauj.-weak |
| 10.0 | 0.34 | 11.2 | 12% CsOH | 2 Hrs.* | 13 | 80 | Zeolite Rho-Strong | |

*at 25°C.

TABLE V

ZEOLITE SYNTHESIS EXPERIMENTS

| | Reactants - Molar Ratios | | | Crystallization Conditions | | | | |
|---|---|---|---|---|---|---|---|---|
| SiO₂/ Al₂O₃ | (Na₂O+ Cs₂O)/SiO₂ | H₂O/ SiO₂ | Added Alkali | Time, days | | Temp.°C | Reaction Products- Crystallinity | Extra Phases |
| | | | | Incubation | Crystallization | | | |
| 10.0 | 0.33 | 11 | 9% CsOH | 3–25°C | 4 | 100 | Zeolite Rho-Med. | +Zeolite B-Med |
| 10.0 | 0.33 | 11 | 9% CsOH | 30–25°C | 12 | 90 | Zeolite Rho-Med. | |
| 10.0 | 0.33 | 11 | 9% CsOH | 44–25°C | 6 | 80 | Zeolite Rho-Med. | +Zeolite B-Weak |
| 10.0 | 0.34 | 7.8 | 12% CsOH* | 10–25°C | 14 | 70 | Zeolite Rho-Med. | |
| 10.0 | 0.34 | 7.8 | 12% CsOH* | 18–25°C | 28 | 60 | Zeolite Rho-Strong | |

TABLE V-continued

ZEOLITE SYNTHESIS EXPERIMENTS

| Reactants - Molar Ratios | | | | Crystallization Conditions | | | Reaction Products- Crystallinity | Extra Phases |
|---|---|---|---|---|---|---|---|---|
| $SiO_2/Al_2O_3$ | $(Na_2O+Cs_2O)/SiO_2$ | $H_2O/SiO_2$ | Added Alkali | Incubation Time, days | Crystallization | Temp.°C | | |
| 10.0 | 0.35 | 7.8 | 14% CsOH* | 10–25°C | 8 | 80 | Zeolite Rho-Strong | |
| 10.0 | 0.35 | 7.8 | 14% CsOH* | 10–25°C | 14 | 70 | Zeolite Rho-Strong | |
| 10.0 | 0.35 | 7.8 | 14% CsOH* | 18–25°C | 28 | 60 | Zeolite Rho-Med. | |
| 10.0 | 0.35 | 7.8 | 14% CsOH* | 63–25°C | 56 | 50 | Zeolite-Rho-Med. | +Unidentified |

*CsOH added to mixed gel

What is claimed is:

1. A crystalline aluminosilicate zeolite having a composition, expressed in molar ratios of oxides, as follows:

$$XNa_2O:(1-x)Cs_2O:Al_2O_3:Y\ SiO_2:Z\ H_2O$$

wherein X ranges from 0 to about 1, Y is from 5 to about 7 and Z is from 0 to about 10, said zeolite having an X-ray diffraction pattern corresponding to that shown for the (Na,Cs) form in Table II.

2. The crystalline aluminosilicate zeolite of claim 1, which has been base-exchanged with hydrogen or hydrogen precursor cations.

3. The crystalline aluminosilicate zeolite of claim 1 wherein X ranges from about 0.6 to about 0.9.

4. The crystalline aluminosilicate zeolite of claim 1 wherein Y is from about 5.5 to about 6.5.

5. The crystalline aluminosilicate zeolite of claim 1 wherein the Na and Cs ions are at least partially replaced with hydrogen ions.

6. A method of preparing the crystalline aluminosilicate zeolite of claim 1 which comprises preparing an aqueous reaction mixture containing sodium, cesium, silica and alumina in the following proportions, in terms of molar ratios of oxides:

| | | |
|---|---|---|
| $SiO_2/Al_2O_3$ | [6–20] | 9–12 |
| $(Na_2O + Cs_2O)/SiO_2$ | [0.2–0.5] | 0.3–0.4 |
| $H_2O/SiO_2$ | [5–20] | 6–12 |
| $(Cs_2O/(Na_2O + Cs_2O)$ | | 0.06–0.20 | maintaining said mixture at ambient temperatures for at least about 3 days, heating said mixture to a temperature of from about 50° to 110°C., maintaining said temperature for a period of from about 3 to 60 days, and crystallizing a crystalline aluminosilicate zeolite product having the composition and X-ray diffraction pattern of claim 1.

7. The method of claim 6 wherein said crystalline aluminosilicate product is ion-exchanged with $NH_4^+$ ions and thereafter calcined at elevated temperatures to produce the hydrogen form of said crystalline aluminosilicate zeolite product.

* * * * *